United States Patent
Bloy et al.

(10) Patent No.: US 8,698,575 B2
(45) Date of Patent: *Apr. 15, 2014

(54) ANTENNA SWITCHING ARRANGEMENT (71) Applicant: RF Controls, LLC, St. Louis, MO (US)

(72) Inventors: Graham P. Bloy, St. Louis, MO (US);
Matthew E. Pierce, Troy, IL (US);
Christopher Gordon Gervase Turner,
Oakley (GB)

(73) Assignee: RF Controls, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/687,221

(22) Filed: Nov. 28, 2012

(65) Prior Publication Data

US 2013/0093572 A1    Apr. 18, 2013

Related U.S. Application Data

(63) Continuation of application No. 12/538,857, filed on Aug. 10, 2009, now Pat. No. 8,344,823.

(51) Int. Cl.
*H01P 1/10* (2006.01)
*H01P 5/22* (2006.01)

(52) U.S. Cl.
USPC .......................................... 333/101; 333/117

(58) Field of Classification Search
USPC .................... 333/101, 103, 104, 117, 118
See application file for complete search history.

(56) References Cited

U.S. PATENT DOCUMENTS

| | | | |
|---|---|---|---|
| 4,078,217 A | 3/1978 | Beno | |
| 5,375,257 A | 12/1994 | Lampen | |
| 5,686,928 A | 11/1997 | Pritchett et al. | |
| 6,480,108 B2 | 11/2002 | McDonald | |
| 6,667,670 B2 * | 12/2003 | Hong et al. | 333/101 |
| 6,753,782 B2 | 6/2004 | Power | |
| 6,946,990 B2 * | 9/2005 | Monk | 342/174 |
| 6,989,741 B2 | 1/2006 | Kenny et al. | |
| 6,997,266 B2 * | 2/2006 | Jackson et al. | 166/384 |
| 7,002,461 B2 | 2/2006 | Duncan et al. | |
| 7,030,761 B2 | 4/2006 | Bridgelall et al. | |
| 7,061,366 B2 | 6/2006 | Bell et al. | |
| 7,084,717 B2 * | 8/2006 | Okazaki et al. | 333/118 |
| 7,098,794 B2 | 8/2006 | Lindsay et al. | |
| 7,119,687 B2 | 10/2006 | Paulsen et al. | |
| 7,119,738 B2 | 10/2006 | Bridgelall et al. | |
| 7,138,914 B2 | 11/2006 | Culpepper et al. | |
| 7,151,454 B2 | 12/2006 | Washington | |
| 7,154,395 B2 | 12/2006 | Raskar et al. | |
| 7,170,412 B2 | 1/2007 | Knox et al. | |
| 7,183,922 B2 | 2/2007 | Mendolia et al. | |
| 7,183,933 B2 | 2/2007 | Dzurko et al. | |
| 7,187,288 B2 | 3/2007 | Mendolia et al. | |

(Continued)

FOREIGN PATENT DOCUMENTS

EP        0794614        10/1991

*Primary Examiner* — Dean O Takaoka
(74) *Attorney, Agent, or Firm* — Babcock IP, PLLC (57) ABSTRACT

An antenna switching arrangement with a quadrature arrangement of transmission lines through which a desired signal path may be configured via switches selectively grounding junctions of the switching arrangement. The desired path routing a signal from an input port to one or both of first and second output ports to generate a signal with vertical linear polarization, horizontal linear polarization or circular polarization. The selected polarization may be changed as desired and/or multiple antenna switching arrangements applied to enable simultaneous signals with different polarizations.

19 Claims, 6 Drawing Sheets

(56) References Cited

U.S. PATENT DOCUMENTS

| | | |
|---|---|---|
| 7,199,712 B2 | 4/2007 | Tafas et al. |
| 7,199,719 B2 | 4/2007 | Seinberg |
| 7,221,269 B2 | 5/2007 | Onderko et al. |
| 7,538,635 B2 * | 5/2009 | Fukuda et al. ............... 333/117 |
| 8,344,823 B2 * | 1/2013 | Bloy et al. .................... 333/101 |
| 2004/0102869 A1 | 5/2004 | Andersen et al. |
| 2004/0102870 A1 | 5/2004 | Andersen et al. |
| 2004/0233461 A1 | 11/2004 | Armstrong et al. |
| 2005/0258956 A1 | 11/2005 | Neuwirth |
| 2006/0019679 A1 | 1/2006 | Rappaport et al. |
| 2006/0022800 A1 | 2/2006 | Krishna et al. |
| 2006/0187043 A1 | 8/2006 | Allen |
| 2006/0267731 A1 | 11/2006 | Chen |
| 2007/0013516 A1 | 1/2007 | Freitag et al. |
| 2007/0013521 A1 | 1/2007 | Lindsay et al. |
| 2007/0018820 A1 | 1/2007 | Chand et al. |
| 2007/0075864 A1 | 4/2007 | Culpepper et al. |
| 2007/0096909 A1 | 5/2007 | Lally |
| 2007/0097211 A1 | 5/2007 | Washington |
| 2007/0103303 A1 | 5/2007 | Shoarinejad |
| 2007/0103313 A1 | 5/2007 | Washington |
| 2007/0120671 A1 | 5/2007 | Carmichael et al. |
| 2007/0120736 A1 | 5/2007 | MacKenzie et al. |
| 2007/0141997 A1 | 6/2007 | Wulff et al. |
| 2007/0152829 A1 | 7/2007 | Lindsay et al. |

* cited by examiner

ANTENNA SWITCHING ARRANGEMENT

BACKGROUND

1. Field of the Invention

This invention relates to a switching arrangement for controlling the polarisation of multi-element antenna arrays and more particularly to antenna arrays used in Radio Frequency Identification Systems.

2. Description of Related Art

Radio Frequency Identification (RFID) technology utilizes a tag transponder, which may be associated with/attached to an object, and a reader generating an interrogation signal to read and identify the RFID tag(s) within range of the interrogation signal. RFID technologies are broadly categorized using "active" tags with a local power source enabling longer read ranges and/or the communication of greater amounts of data, and unpowered "passive tags" typically transmitting only a unique RFID tag identifier in response to an interrogation signal.

A typical RFID tag includes an electronic circuit that may be in the form of an integrated circuit or silicon chip, whereby the circuit stores and communicates identification data to the reader. In addition to the chip, the tag includes some form of antenna that is electrically connected to the chip. Active tags incorporate an antenna which communicates with the reader from the tag's own power source. For passive tags, the antenna acts as a transducer to convert radio frequency (RF) energy originating from the reader to electrical power, whereby the chip becomes energized and performs the communication function with the reader via backscatter modulation. Alternatively, a passive tag may be coupled to an energized circuit, responding with dynamic data from the energized circuit, such as environmental/status data such as temperature, humidity and/or battery condition.

An RFID communication system may include scanning interrogation beam technologies to focus the interrogation signal upon a designated location within a target space, thus identifying with greater sensitivity/accuracy the presence, location and/or direction of movement of an individual RFID Tag within a three dimensional target area. For example, International Patent Application publication number WO 2009/035723, titled "Radio Frequency Signal Acquisition and Source Location System" filed Mar. 30, 2008 by Bloy et al, and International Patent Application publication number WO2009/034526, titled "Steerable Phase Array Antenna RFID Tag Locater and Tracking System", filed Sep. 9, 2008 by Bloy, both applications commonly owned with the present application and hereby incorporated by reference in their entirety, describe systems of cooperating steerable phased array antennas performing beam scans of a target area, via an electronic beam steering circuit such as an array of phase shifters coupled to a corresponding array of antenna elements of a panel antenna, from which the presence and location of individual RFID tags is derived by logical processing of historical signal data obtained from prior scans of the target area.

In environments where a large number of RFID tags are present, the ability of the reader to read each of the RFID tags, the read rate, may be significantly degraded. The degradation may be generated by interference from other RFID tags and/or the RFID tags may block or partially block one another along a signal path to the antenna generating the interrogation signal.

The orientation of the RFID tag and/or tag antenna with respect to the interrogation signal path will determine the signal level received by the RFID tag and/or any response signal generated by the RFID tag exposed to the interrogation signal. For example, an RFID tag oriented in a plane normal to the interrogation signal path will provide a stronger signal response than an RFID tag oriented in a plane parallel, an edge view, to the interrogation signal path.

Interrogation signals may be launched from the reader antenna with a desired electric field plane polarization, such as vertical, horizontal or circular polarization. For vertical and horizontal polarization, the electric field plane is oriented either vertically or horizontally. For circular polarization, the electric field plane is rotated during modulation, for example rotating in a circle making one complete revolution during one period of the wave.

Linear polarity interrogation signals, vertical or horizontal, when aligned with the antenna orientation of the RFID tag, may provide improved communications performance compared to circular polarity interrogations signals. However, communications performance is significantly degraded in linear polarization configurations, if the signal/antenna alignment is not optimal. Circular polarization interrogation signals provide reduced communications performance but enable communications with RFID antennas in a much larger range of RFID tag orientations. However, where RFID tags are closely spaced, circular polarisation interrogation signals may experience significant communications performance degradation, thereby reducing the amount of energy available for each of the closely spaced tags, reducing the minimum operating distance between a reader and the plurality of tags and/or requiring increased incident/transmit power from the reader. It may not always be possible to increase reader transmit power because of radio regulations and decreasing the distance between the reader and the plurality of tags may not be possible because of the use case or physical environment.

U.S. Pat. No. 6,367,697 "Reader Arrangement for an Electronic Identification System having a Plurality of Reader Heads for Energizing Transponders" by Turner et al, teaches an reader arrangement in which multiple antennas and/or multiple element antenna arrays may alternatively utilized during RFID tag communication to improve communications performance with the diversity of antennas associated with RFID tags. Although U.S. Pat. No. 6,367,697 teaches switching and phase delay, it does not disclose or suggest a means to change and/or dynamically switch the polarisation of the antenna array and simultaneously accommodate the phasing and splitting circuits required.

Therefore, it is an object of the invention to provide antenna switching arrangement(s) and method(s) that overcome deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

The inventors have recognized that for a given RFID tag antenna orientation, signal interference level and/or partial signal blockage situation, the reception of a reader signal by and/or the signal strength of any response signal returned from an RFID tag can be significantly impacted by the signal polarization that is applied to the reader signal. Therefore, a reader/antenna with the ability to transmit an reader signal with multiple polarizations may be able to detect RFID tags that would otherwise be missed by a reader/antenna with the traditional single polarization interrogation signal capability.

A reader/antenna equipped to transmit the reader signal with multiple polarizations may be configured to apply each of these alternative reader signal polarizations in sequence, while monitoring the number of responses and signal strengths of each response obtained from each polarization of the reader signal. By comparing these results, the reader and/or a processor coupled to the reader may be able improve the read rates of high-density RFID tag populations and/or interpret the orientation in space of a specific RFID tag.

Switching between polarizations of the reader signal may be performed by alternatively coupling a plurality of antenna elements or feeds arranged in array(s), for example with a matrix of antenna elements configured for each desired polarization (vertical linear, horizontal linear and/or circular polarization) selectable by the reader/antenna and/or systems controlling the reader/antenna.

During an interrogation sequence of a target area with a high density tag population, a first reader signal with a first polarization is beamed at the target area and any responses received from RFID tags in the area recorded. Then a second reader signal with a second polarization is beamed at the target area and again any responses received from RFID tags in the area are recorded. Similarly, a third reader signal with a third polarization may also be applied.

The responses may then be compared and any variance reported, for example as indications of individual RFID tag orientations and/or the response of from each reader signal may be filtered against one another to compile a list of RFID tags currently present. Because the compiled list has the benefit of each polarization's advantage of reading RFID tags of a particular orientation, partial blockage and/or signal interference rejection with respect to the signals of other tags, the compiled list is an improvement over the read rate obtainable utilizing a single reader signal polarization according to conventional RFID readers.

The inventors have devised an antenna arrangement especially suited for such systems, including a plurality of antennas or antenna elements and a combination phase delay line and switching mechanism which when instructed by the reader or by some other switching controller, causes the signal polarisation of an emitted reader signal to be switched between one or more linear polarisation modes and at least one circular polarisation mode; wherein the energy is directed to a first or second antenna by shorting out the undesired antenna port, thereby redirecting energy from the undesired port to the desired port.

The invention provides an additional benefit in that antenna polarisation may be controlled by simple DC control voltages with extremely fast switching times in the order of a few nanoseconds. A further advantage of the switching circuit is that it may be constructed using low cost printed circuit techniques.

The invention comprises a number of transmission lines arranged in a "branchline" or hybrid junction configuration such that there are four ports arranged as a matched four-way hybrid with quadrature sequenced ports. The purpose of the hybrid is to provide a phase shift network or delay network wherein the phase of the signal applied at the input port is delayed by different amounts at each output port. In the invention the quadrature hybrid is modified to provide a phase shift network such that the arms between the ports provide the necessary phase delay to feed the crossed elements of a multi-element antenna array or to control the phase of signals to an antenna having multiple feed points. The invention further provides a number of switches that may short circuit one or more of the hybrid output ports as determined by a separate controller. When the switches are operated in a certain pattern radio frequency energy is directed to a first antenna or to a second antenna or to both a first and second antenna simultaneously in order to cause the antenna array or the antenna with multiple feed-points to radiate signals of substantially a first linear polarisation, a second linear polarisation or a circular polarisation.

The antenna arrangement may include a pair of antenna elements such as a pair of dipoles arranged at right angles to each other; the dipoles being fed with separate feed-lines connecting the feed-point of each dipole to the respective outputs of a hybrid delay and switching arrangement.

The arrangement may include a single element antenna such as a patch, panel or other antenna having a plurality of feed-points or taps spaced around the radiating element so as to provide radiated signals having differing polarisations. In further embodiment(s), the arrangement may similarly include one or more slot antenna(s) of either a simple or complex shape having individual or a plurality of feed-points.

The invention provides a branchline coupler to feed elements in quadrature for circular polarization, with the ability to short either leg for linear polarization since each leg is related to the other via quarter wave lines which appear as an open circuit at one end when the other end is shorted.

Figure 1:
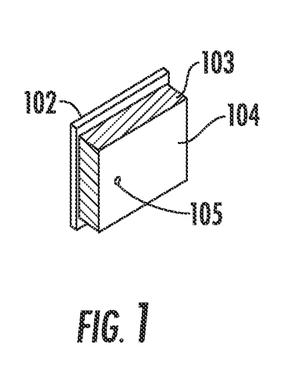
FIG. 1 is a schematic isometric view of a single feed-point linearly polarized patch antenna.

An exemplary embodiment of an antenna arrangement is described in detail with reference to FIGS. 1-5. FIG. 1 shows a linearly polarised patch antenna comprising a conductive back plane 102, a dielectric spacer 103, a conductive radiating patch 104 and a first feed-point 105. By rotating the patch antenna, either vertical linear polarization or horizontal linear polarization may be obtained. The conductive back plane 102 may be cost effectively formed as a printed circuit board layer, such as on a back side of a printed circuit board, the printed circuit board dielectric substrate operative as the dielectric spacer 103 and the radiating patch 104 may be another layer of the printed circuit board, such as a front side of the printed circuit board.

Figure 2:
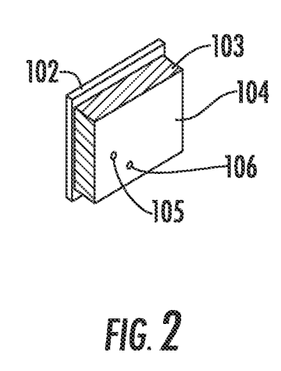
FIG. 2 is a schematic isometric view of a dual feed-point circularly polarized patch antenna, drivable as linear or circular polarized.

Similarly, FIG. 2 shows a patch antenna arranged as a circularly polarised antenna with a first feed-point 105 and a second feed-point 106, the first feed-point 105 and the second feed-point 106 arranged proximate sides of the radiating patch 104 that are transverse to one another.

Figure 3:
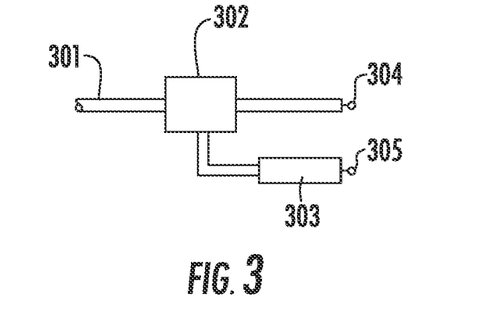
FIG. 3 is a schematic diagram of a transmission line based feed arrangement for driving the patch antenna of FIG. 2 with a circular polarization.

FIG. 3 shows a typical feed arrangement for obtaining circular polarisation using a patch antenna. The input port 301 is connected to a two-way splitter 302 that divides the signal from the input port 301 equally in two directions. A delay line 303 is provided to delay the signal to the second port 305, by increasing the length of the signal path there along. First port 304 is connected to the first feed-point 105 on the patch antenna and second port 305 is connected to the second feed-point 106.

Figure 4:
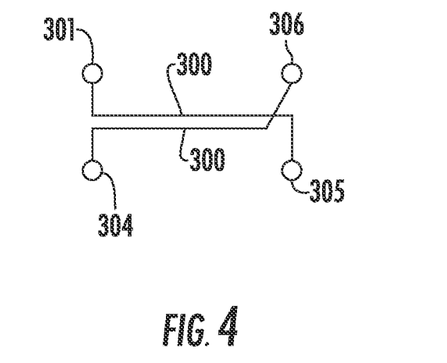
FIG. 4 is a schematic diagram of a directional coupler based feed arrangement for driving the patch antenna of FIG. 2 with a circular polarization.

Alternatively, FIG. 4 demonstrates a directional coupler which serves the same function. The electromagnetic coupling along the adjacent transmission lines 400 of the directional coupler divides the signal equally between the first port1 304 and the second port 305. To minimize undesired signal reflections, a third port 306 is terminated with a load generally equal to the characteristic impedance of each of the other ports. Transmission line length differentials characteristic of the coupler may be tuned to provide any desired phase shift.

Figure 5:
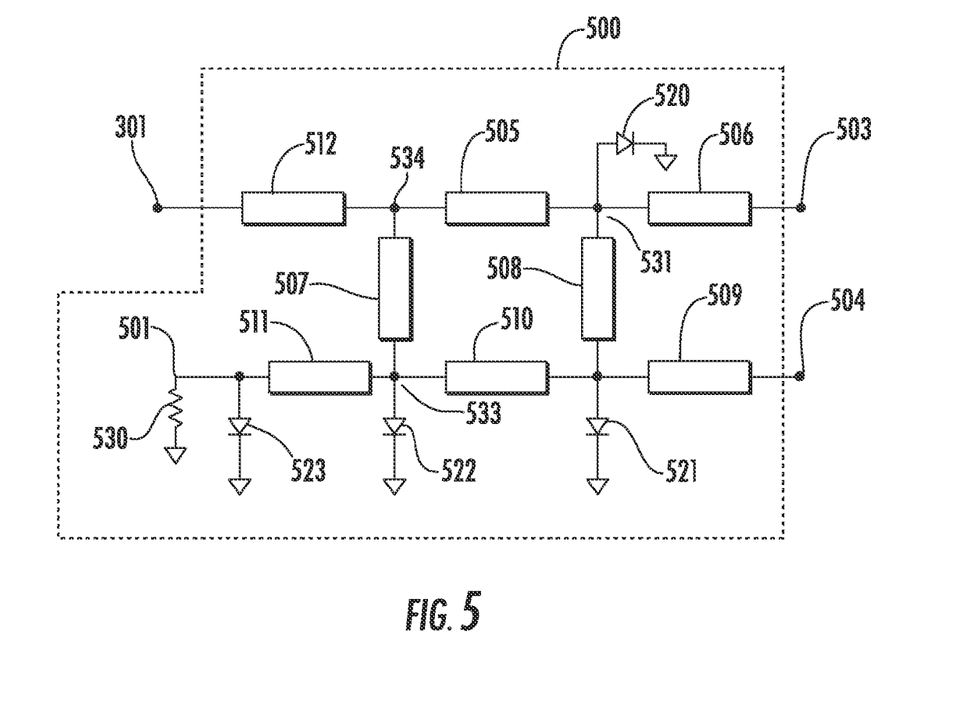
FIG. 5 is a quadrature hybrid arrangement for selectively driving a two feed-point antenna with vertical linear, horizontal linear or circular polarization.

FIG. 5 demonstrates a quadrature hybrid arrangement of the exemplary embodiment. A 'branchline' quadrature hybrid coupler circuit is formed by first, second, third and fourth quadrature transmission lines 505, 507, 508 and 510. Each of these elements, as well as transmission line 511, are generally equal to an electrical length of 90 degrees i.e. one quarter of a wavelength long of the desired reader mid-band signal frequency. first, second, third and fourth transmission lines 506, 509, 511 and 512 are transmission lines used to respectively connect the input port 301, first output port 503, second output port 504 and terminating junction 501 to the quadrature transmission line structure. First switch 520, second switch 521, third switch 522 and fourth switch 523, here diodes, are used to selectively short circuit to neutral and/or ground the associated first, second, third and fourth junctions 531, 532, 533 and 534 of the quadrature transmission line structure.

Input port 301 is the input-output port that would normally be connected to a transmitter, receiver or transceiver depending on the application. The circuit is bi-directional and therefore performs identically in either direction of signal flow. For the purpose of this description it is assumed that signals flow in the direction from input port 301. A signal applied to input port 301 flows through fourth transmission line 512 to the fourth junction 534 of first and second quadrature transmission lines 505 and 507 where it is divided. The relative impedances of each branch determine the power split of signal at each junction, here the input of first and second quadrature transmission lines 505 and 507 respectively.

When operating in the circular polarisation mode, power also flows to both first and second output ports 503 and 504 through the third quadrature transmission line 508 which provides a 90 degree phase shift. The signal flowing passing through the first quadrature transmission line 505 is also one electrical quarter wavelength long, i.e. 90 degrees. The signal further passes through first transmission line 506 which also has a 90 degrees electrical length. The phase of the signal is therefore shifted by 180 degrees before appearing at first output port 503, vertical linear polarization. The other part of the signal passes through the lower branch by way of second quadrature transmission line 507 which is 90 degrees electrical length, thus shifting the phase of the signal by 90 degrees. The signal further passes through fourth quadrature transmission line 510 where it is phase shifted by a further 90 degrees at the junction of third quadrature transmission line 508 and second transmission line 509. The signal passes through second transmission line 509 where it is further shifted by 90 degrees resulting in a total phase shift of 270 degrees at the second output port 504, horizontal linear polarization. When the first and second output ports 503 and 504 are connected to two antennas or two antenna feed points arranged at right angles to each other, the effect is that the signals applied to the two antennas or antenna ports will have a phase difference of 90 degrees between them. As is known in the art, this 90 degree phase difference causes the signal radiated by the antenna array to be circularly polarised. Fourth transmission line 512 may be formed with an electrical length of 90 degrees to act as an impedance buffer to the source signal.

The length of third transmission line 511 is significant where energy is directed from input port 301 to second output port 504. Resistor 530 is a terminating resistor selected to be generally equal to the characteristic impedance of the terminating junction 501. Thus, terminating junction 501 is the characteristic impedance as it is terminated by resistor 530, operative to improve isolation thus ensuring accurate phase shifts across the quadrature transmission line structure, in particular to first and second output ports 503 and 504.

When the apparatus is intended to provide a linearly polarised signal mode, the apparatus maybe controlled to provide an output signal at either first output port 503 or second output port 504 depending on the condition of the first, second, third and fourth switches 520, 521, 522, 523 (here demonstrated as diodes). For discussion purposes it is assumed that first output port 503 is assigned to a vertically polarised antenna or antenna feed-point and second output port 504 is assigned to a horizontal antenna or feed-point. If it is desired to radiate only a vertically polarised signal, then second and third switches 521, and 522 are switched on. Where diodes are applied as the switches, each is forward biased so that they conduct and effectively short the second and third junctions 532 and 533. Note that the state of fourth switch 523 is irrelevant when third switch 522 is switched on. Shorting second and third junctions 532 and 533 will appear as opens at first and fourth junctions 531 and 534, via quarter wave third and second transmission lines 508 and 507 respectively, so that all the power is diverted to first output port 503. If it is desired to radiate only a horizontally polarised signal then first and fourth switches 520 and 523 are switched on to short first junction 531 and load resistor 530 to the circuit neutral or ground so that all the power from input port 301 appears at the second output 504. Since third transmission line 511 is a quarterwave transmission line, it will appear as high impedance at third junction 533 when fourth switch 523 is switched on.

Figure 6:
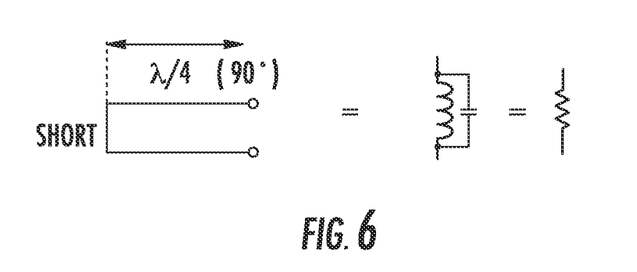
FIG. 6 is a demonstration of the RF electrical equivalents of a quarter-wave short circuit transmission line.

The use of quarter wave transmission line allows the known principles of transmission line transformers to be used in the hybrid quadrature ring. An electrical quarter wavelength transmission line has inverting properties. That is if one end of a quarter wave line is open circuit, the opposite end appears to be short circuit or if one end is short circuited the other end appears to be an open circuit, as shown in FIG. 6. A shorted quarter wave transmission line is equivalent to a parallel tuned circuit that has only a very high impedance resistive component. In the case of the present embodiment, when only a vertically polarised signal is required, first switch 520 is switched on, in other words short circuiting the first junction 531, the opposite end of the first quadrature transmission line 505 at the junction of fourth transmission line 512 and second quadrature transmission line 507 (fourth junction 534) appears an open circuit or very high impedance. Also, the impedance at first output port 503 becomes very high impedance thus presenting a high impedance load to the antenna feed-point and in turn reducing the amount of mutual interaction between the vertical feed and any other feeds.

Figure 7:
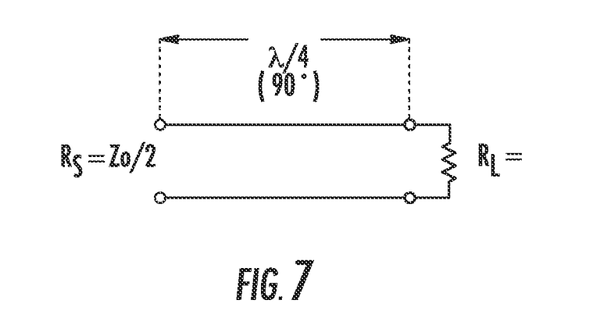
FIG. 7 is a demonstration of the impedance transforming characteristics of a quarter wave transmission line.

The inverting properties of a quarter wavelength transmission line is also used to convert the impedances in the hybrid when one or other output is switched. FIG. 7 shows the impedance transforming characteristics of a quarter wave line. Source impedance $R_S$ is smaller than load impedance $R_L$. By using a quarter wave transmission line having a characteristic impedance $Z_0$ to connect $R_S$ and $R_L$ such that $Z_0^2=R_S*R_L$ the impedance $R_L$ is transformed to provide a match to source impedance $R_S$. In the case of the present embodiment, input impedance of input port 301 is the characteristic impedance. However, because first output port 503 and second output port 504 both have an impedance equal to the characteristic impedance, without an impedance transforming network, the junction would have an impedance of 0.5 the characteristic impedance, that is the impedance of first output port 503 and second output port 504 in parallel. First and fourth quadrature transmission lines 505 and 510 are arranged to have a characteristic impedance of 0.707 times the characteristic impedance and so act as transmission line transformers to convert the impedances in the hybrid to correctly match the port impedances when both first output port 503 and second output port 504 are active.

Figure 8:
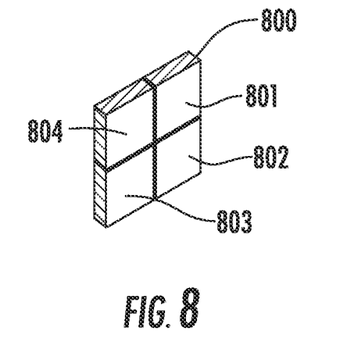
FIG. 8 is a schematic isometric view of a four element phased antenna array.
Figure 9:
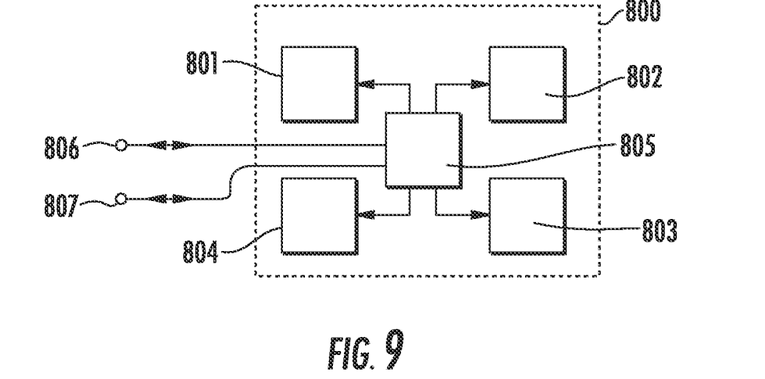
FIG. 9 is a block diagram of a four element phased antenna array module.

FIGS. 8 and 9 demonstrate another embodiment where a number of antenna switching arrangements according to this invention are used to improve the performance of an electrically steerable phased array antenna system, for example according to WO 2009/035723. In this embodiment, a phased antenna array 800 comprises a plurality of individual panel antennas, here first panel antenna 801, second panel antenna 802, third panel antenna 803 and fourth panel antenna 804 that are controlled by a logic controller 805. RF input/output signal 806 is split four ways between the four panel antennas. Although demonstrated with four panel antennas, the number of panel antennas applied may be varied according to the desired system parameters, target area and/or RF environment.

Each of the first, second, third and fourth panel antennas 801, 802, 803 and 804 has a split antenna feed point arranged to feed each of the panels such that one of the feed points provides a vertically polarised emission and the second feed-point provides a horizontally polarised emission. The two feed points on each panel being connected to a hybrid quadrature arrangement 500 for example as shown and described herein above in FIG. 5. The controller 805 may be arranged to perform the function of concentrating the control of each of the panels and splitting of the radio frequency signal. Alternatively, the controller 805 may also be arranged to control the phase of the signal applied to each of the panels so to steer the beam of the array, for example as disclosed in WO 2009/035723. The control line 807 may be connected to an external controller such that a back end processor or computer may switch the polarisation of the emitted signals. Alternatively the control line 807 may also be used by an external controller to steer the beam direction of the antenna, for example as disclosed by WO 2009/035723.

The present embodiment further applies to an array, which may consist of a plurality of antennas, connected by a feed network. Since the array will radiate with a consistent polarization, the control of a single antenna would be the same as the control for a plurality of antennas. The network depicted in FIG. 5 may be applied to any element, or elements in an array, in order to provide switching of the polarization of the signal path.

In some applications it may be desirable to emit a horizontally polarised signal from a number of the antenna panels whilst simultaneously emitting a vertically polarised signal from other antennas. Likewise the array may be arranged to emit signals of any combination of vertical, horizontal and/or circularly polarised antennas as required by the application or as determined by decision circuitry within controller 805 based on the characteristics of the received signals. In the case of the RFID system described in the introduction to this invention, tags may be distributed in random orientations. The controller may instruct the RFID reader to conduct an inventory of tags present. The controller may automatically switch the polarisation of the emitted signal in a random or predetermined pattern. The controller may cause the RFID reader to conduct multiple interrogations of the read field, the controller causing the emitted radiation pattern and/or polarisation to be changed or modified for each interrogation sequence until the inventory has been completed.

For clarity purposes in the above circuit description the switching interface for the diode type switches has not been shown. One skilled in the art will appreciate that any of several diode switching arrangements well established in the art may be applied, such as a dc control voltages. Further, alternative switches may be applied if desired, such as field effect transistors, mechanical switches or the like.

Figure 10:
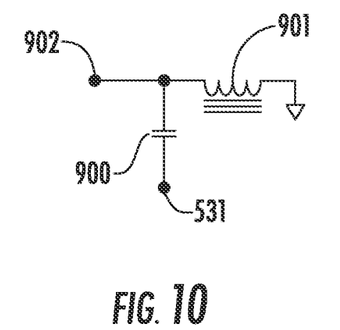
FIG. 10 is an exemplary inductor based junction switching arrangement.

Another alternative switch arrangement, an inductor driven impedance switch, is shown in FIG. 10. Demonstrated as a replacement for the diode type switch 520 presented in FIG. 5, the connection to first junction 531 is direct current isolated by a capacitor 900, operating as a DC break. An inductor 901, for example with a magnetic core, such as ferrite, has a steady state reactance selected to be a value of a least 10 and preferably 20 times the characteristic impedance of the associated junction, here first junction 531. Application of a control voltage to control port 902 energizes the inductor coil, generating a magnetic field at a level causing the magnetic core to saturate, dramatically reducing the effective impedance appearing at first junction 531, effectively switching the junction between short and open circuit according to the application of the control voltage to control port 902.

The various transmission lines and/or quadrature transmission lines may be cost effectively formed with high precision on a printed circuit board. Alternatively, the transmission lines and/or quadrature transmission lines may be formed as strip lines or microstrips. In forming the quadrature transmission lines, one or more lumped reactive components, such as capacitors, inductors and/or transmission line transformers may be used to perform any desired phase delay for each of the transmission line branches in the branch line coupler. In the case when inductors or transmission line transformers are used, the reactive switching arrangement using saturating inductors; the switches may be formed utilizing the same inductors or transformers used as the delay line components, thus reducing the number of components required. Thereby, an improvement in manufacturing cost and reliability is realized because the total number of system components is reduced.

It will be appreciated by those skilled in the art that the invention is not limited to the embodiments described above but that the invention may also be applied to other forms of radio communication where it is desired to alter the polarisation of an emitted or received signal of a single antenna or a plurality of antennas or a plurality of antennas arranged in one or more arrays.

One skilled in the art will appreciate that the embodiments described herein provide a novel means to switch radio frequency energy to a multi-element antenna or an antenna having multiple feed points, such that the phase of the feed signal may be changed and the polarisation may be nearly instantly and reliably switched between vertical, horizontal or circular in a simple, compact and cost effective manner, without requiring directional couplers or external delay lines.

| Table of Parts | |
|---|---|
| 102 | conductive back plane |
| 103 | rules engine |
| 104 | radiating patch |
| 105 | first feed-point |
| 106 | second feed-point |
| 300 | adjacent transmission line |
| 301 | input port |
| 302 | two-way splitter |
| 303 | delay line |
| 304 | first port |
| 305 | second port |
| 306 | third port |
| 501 | terminating junction |
| 503 | first output port |
| 504 | second output port |
| 505 | first quadrature transmission line |
| 506 | first transmission line |
| 507 | second quadrature transmission line |
| 508 | third quadrature transmission line |
| 509 | second transmission line |
| 510 | fourth quadrature transmission line |
| 511 | third transmission line |
| 512 | fourth transmission line |
| 520 | first switch |
| 521 | second switch |
| 522 | third switch |
| 523 | fourth switch |
| 530 | resistor |
| 531 | first junction |
| 532 | second junction |
| 533 | third junction |
| 534 | fourth junction |
| 801 | first panel antenna |
| 802 | second panel antenna |
| 803 | third panel antenna |
| 804 | fourth panel antenna |
| 805 | controller |
| 807 | control line |
| 900 | capacitor |
| 901 | inductor |
| 902 | control port |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

The invention claimed is:

1. An antenna switching arrangement, comprising: an input port coupled via a fourth transmission line to a fourth junction of a quadrature arrangement of quadrature transmission lines also provided with a first, a second and a third junction; the first junction provided with a first switch operable to selectively couple the first junction to ground; the second junction provided with a second switch operable to selectively couple the second junction to ground; the third junction provided with a third switch operable to selectively couple the third junction to ground; the first junction coupled via a first transmission line to a first output port; the second junction coupled via a second transmission line to a second output port; a terminating junction coupled via a third transmission line to the third junction; a fourth switch operable to selectively couple the terminating junction to ground; and a resistor coupled between the terminating junction and ground; at least one of the first, second, third and fourth switches are inductors.

2. The arrangement of claim 1, wherein the first quadrature transmission line and the fourth quadrature transmission line have a characteristic impedance of generally 0.707 times a characteristic impedance of the input port.

3. The arrangement of claim 1, wherein the first, second, third and fourth quadrature transmission lines, each have an electrical length of one quarter of a wavelength of a desired signal frequency.

4. The arrangement of claim 1, wherein at least one of the switches are diodes.

5. The arrangement of claim 1, wherein the inductor is are selectable by applying a control voltage to the inductor selected to cause magnetic saturation of a core of the inductor, reducing a reactance of the inductor.

6. The arrangement of claim 1, wherein the first output is coupled to a vertical linear polarization antenna.

7. The arrangement of claim 1, wherein the second output is coupled to a horizontal linear polarization antenna.

8. The arrangement of claim 1, wherein the quadrature transmission lines are traces on a printed circuit board.

9. The arrangement of claim 1, further including multiple antenna switching arrangements, the first switch, second switch, third switch and fourth switch of each of the multiple antenna switching arrangements controlled by a controller.

10. The arrangement of claim 1, wherein the quadrature transmission lines are formed using at least one lumped reactive component.

11. The arrangement of claim 10, wherein at least one of the switches is an inductor integral to the transmission line inductors; the switches selectable by applying a control voltage to the inductor selected to cause magnetic saturation of a core of the inductor, reducing a reactance of the inductor.

12. A method for switching the polarity of an RF signal, comprising the steps of:
coupling the RF signal to an input port of a quadrature transmission line arrangement having a first output and a second output;
setting a plurality of switches of the quadrature transmission line arrangement to select a desired signal path between the first output, the second output and simultaneously to the first output and the second output;
wherein at least one of the switches is an inductor.

13. The method of claim 12, wherein each of the plurality of switches selectively couples a respective junction of the quadrature transmission line arrangement to ground, thereby short circuiting the selected junction(s) to define the desired signal path.

14. The method of claim 12, wherein the inductor is isolated from the respective junction by a capacitor, the inductor selectable by applying a control voltage to the inductor selected to cause magnetic saturation of a core of the inductor, reducing a reactance of the inductor.

15. The method of claim 12, wherein a phase of the signal at the first output and a phase of the signal at the second output are ninety degrees apart.

16. The method of claim 12, wherein the setting of the switches is alternated between defining the signal path resulting in a selected polarization of one of a vertical linear polarization, a horizontal linear polarization and a circular polarization.

17. The method of claim 12, wherein the setting of the switches is performed by a controller.

18. The method of claim 17, wherein the controller controls multiple separate quadrature transmission arrangements.

19. The method of claim 18, wherein the controller directs at least one of the multiple separate quadrature transmission arrangements to generate a signal in a different polarization.

* * * * *